United States Patent [19]

McFarland et al.

[11] Patent Number: 4,480,980

[45] Date of Patent: Nov. 6, 1984

[54] APPARATUS FOR EXTRUDING COMPOSITE FOOD PRODUCTS

[75] Inventors: Archie R. McFarland; Jack C. Middleton; Claudio dos Santos, all of Salt Lake County, Utah

[73] Assignee: Beehive Machinery, Inc., Sandy, Utah

[21] Appl. No.: 72,054

[22] Filed: Sep. 4, 1979

Related U.S. Application Data

[63] Continuation of Ser. No. 956,973, Nov. 2, 1978, abandoned, which is a continuation-in-part of Ser. No. 772,733, Feb. 28, 1977, abandoned.

[51] Int. Cl.³ .......................... A22C 7/00; B29D 7/02; B29F 3/04
[52] U.S. Cl. .................... 425/131.1; 99/483; 425/463
[58] Field of Search ..................... 425/130, 131.1, 465, 425/466, 463; 426/274, 249, 502, 512, 513, 516, 517, 802; 366/160, 196; 99/426, 432, 483; 418/70

[56] References Cited

U.S. PATENT DOCUMENTS

| | | | |
|---|---|---|---|
| 1,947,541 | 2/1934 | Wengel | 425/131.1 |
| 2,722,177 | 11/1955 | Routh | 425/131.1 |
| 2,968,253 | 1/1961 | Autio | 418/70 |
| 3,014,437 | 12/1961 | Dutchess | 425/131.1 |
| 3,187,390 | 6/1965 | Fränkel et al. | 425/466 |
| 3,213,808 | 10/1965 | Schafer | 425/131.1 |
| 3,370,553 | 2/1968 | Rich et al. | 425/131.1 |
| 3,392,685 | 7/1968 | Briggs | 425/131.1 |
| 3,416,931 | 12/1968 | Posegate | 426/513 |
| 3,427,999 | 2/1969 | Schultz | 425/131.1 |
| 3,505,085 | 4/1970 | Straughn et al. | 425/130 |
| 3,724,984 | 4/1973 | Jernigan | 425/463 |
| 3,793,466 | 2/1974 | Hawkins et al. | 426/274 |
| 3,825,231 | 7/1974 | McFarland | 366/196 |
| 3,837,773 | 9/1974 | Raley | 425/131.1 |
| 3,840,311 | 10/1974 | Wight | 425/131.1 |
| 3,860,036 | 1/1975 | Newman | 425/131.1 |
| 3,920,366 | 11/1975 | Randall | 425/131.1 |
| 4,099,455 | 7/1978 | Wenger | 425/131.1 |
| 4,175,486 | 11/1979 | Hildebolt et al. | 99/483 |

Primary Examiner—Willard E. Hoag
Attorney, Agent, or Firm—Philip A. Mallinckrodt

[57] ABSTRACT

Readily disassembled and reassembled apparatus for extruding composite food products, especially simulated slab bacon, includes an extrusion assembly comprising a die having a housing within which extend a plurality of individual die conduits from a front wall provided with openings leading into the die conduits. The space surrounding the die conduits within the housing form die passages interleaved with the die conduits. Means are provided for extruding a food material through the front wall openings and through the die conduits into a convergent discharge conduit removably attached to the housing. Separable supply conduits connect a pressure source of supply of a different food material with the housing at opposite sides thereof as well as between such opposite sides. The supply conduits include an elongate manifold conduit extending transversely of the housing, a pair of substantially semi-circular conduit fittings for connecting opposite ends of the manifold conduit with the opposite sides of the housing, respectively, and at least one conduit for connecting the manifold conduit intermediate its ends with the housing between the opposite sides thereof.

9 Claims, 12 Drawing Figures

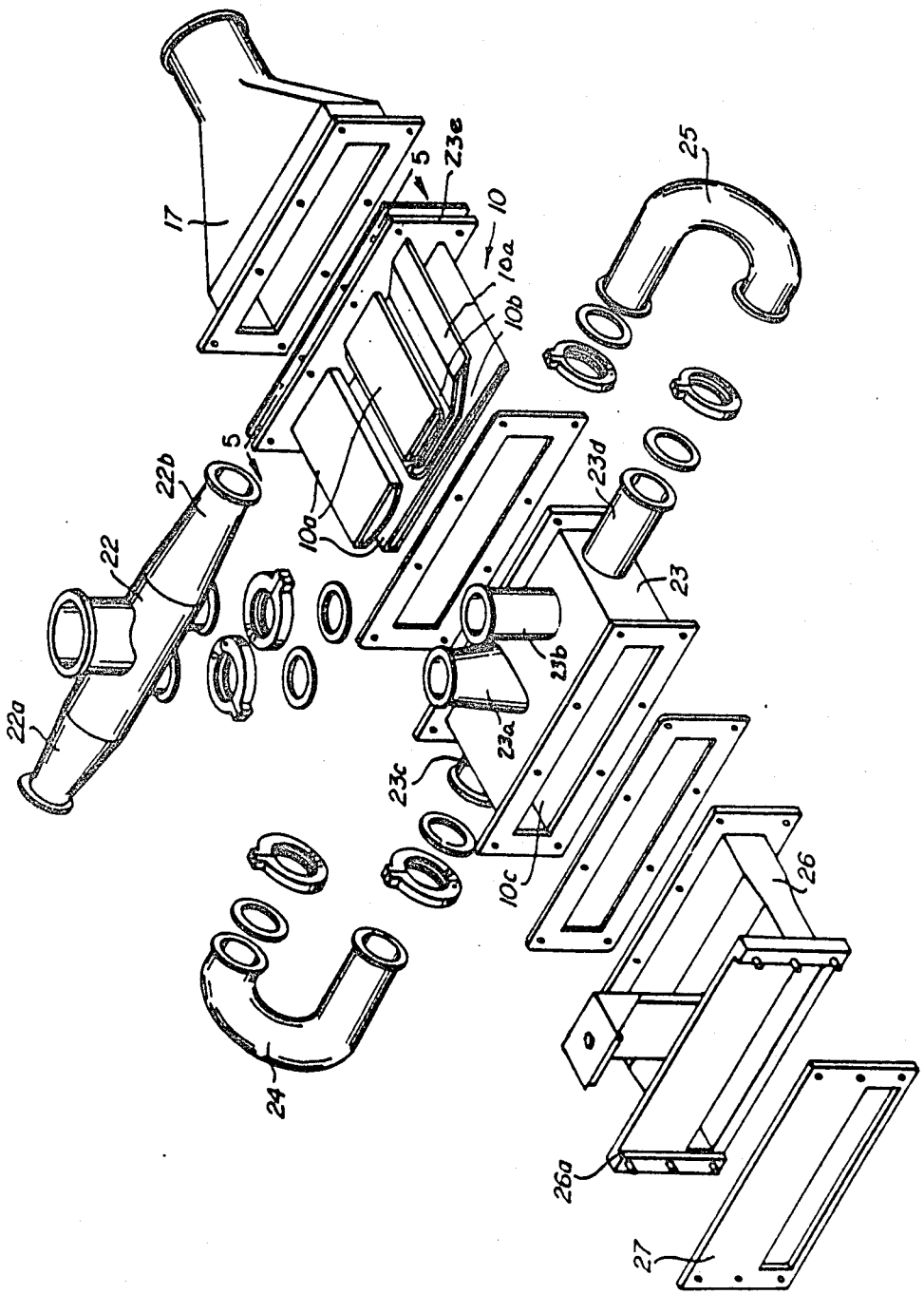

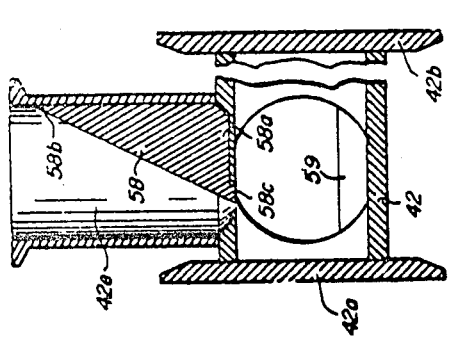
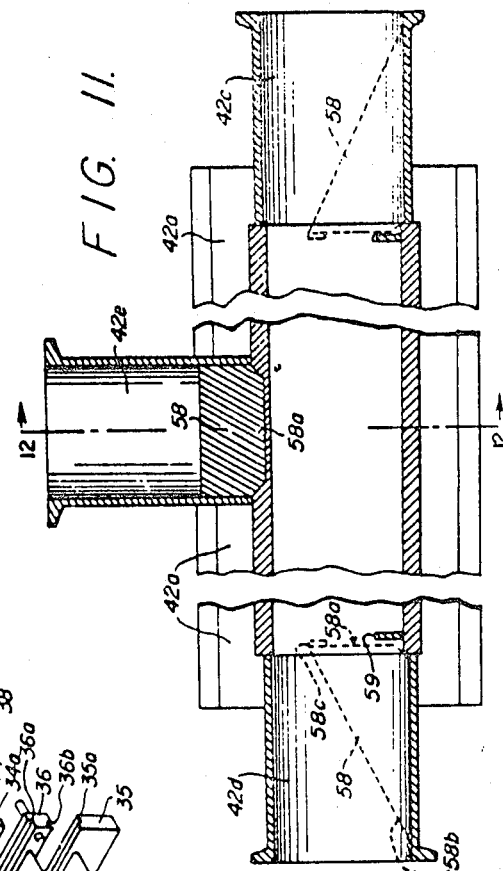
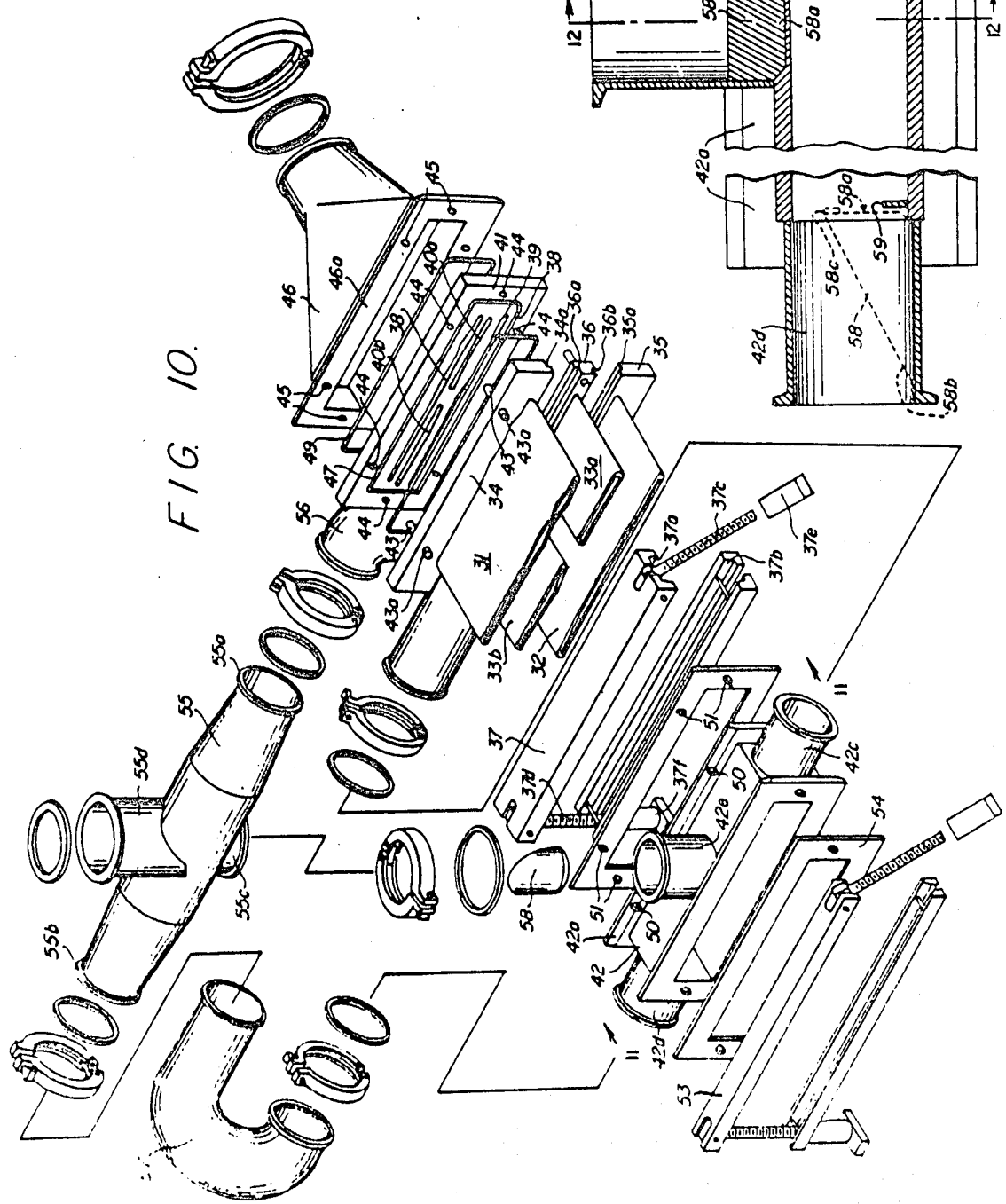

APPARATUS FOR EXTRUDING COMPOSITE FOOD PRODUCTS

RELATED APPLICATIONS

This application is a continuation of application Ser. No. 956,973, filed Nov. 2, 1978, which is a continuation-in-part of application Ser. No. 772,733, filed Feb. 28, 1977, both being now abandoned.

BACKGROUND OF THE INVENTION

1. Field

The invention is in the field of apparatus for extruding composite food products, for example, consolidating and shaping normally unattractive and commercially unacceptable pieces of flesh and fat into attractive and commercially acceptable meat shapes.

2. State of the Art

Loaves and other shapes of meat materials have long been prepared by manually arranging different meat pieces together, with or without binders, and by consolidating such pieces under pressure to form a product which is commercially attractive and can be sliced. Some attempts have been made heretofore to simulate cuts of meat, such as bacon slabs by this technique. Also, ground or emulsified meat and fat mixtures have been extruded and cut to simulate known commercial cuts. Various types of apparatus have been developed heretofore for extruding different materials, such as soap of different colors, and consolidating the different materials as a final unitary product.

3. Objective

The present invention has as its primary objective to eliminate time consuming and expensive manual fabrication of commercially acceptable meat shapes having desirable striation of different meat or meat and fat characteristics, especially simulated bacon slabs, by apparatus that effectively accomplishes the purpose and can be quickly and easily disassembled for cleaning and reassembled for further use.

BRIEF SUMMARY OF THE INVENTION

In accomplishing the objective of the invention, ingredients for the respective striations are fed to and extruded through different portions of a compound die. The respective extrusions are interleaved as they emerge from the different portions of the die into a common discharge area thereof, where they are compressed into a coherent column and discharged as a continuous column. The column may have any desired shape, as, for example, a slab, and is cut transversely in desired lengths to form the final product, e.g., bacon slabs.

Suitable binders, for example, mineral salts that chemically affect superficial surfaces of meat to provide protein adhesive coatings thereon, are usually included with meat pieces or fragments fed to the die, thereby firmly binding such pieces or fragments together under the pressures encountered during extrusion.

The operation is advantageously carried out under conditions of deaeration of the feed materials, thereby insuring against the occurrence of undesirable voids in the resulting product.

When the product is bacon, the die may be configurated to produce striations of random thicknesses and positions closely simulating those of natural bacon. The extruded column may be cooled preparatory to the immediate slicing of bacon strips from the column, or the extruded column may be exposed to microwaves for protein coagulation and then case hardened and tempered in the usual manner for slicing.

The apparatus includes an extrusion assembly comprising a die having a housing within which extend a plurality of individual die conduits from a front wall provided with openings leading into the die conduits. The space surrounding the die conduits within the housing form die passages interleaved with the die conduits. Means are provided for extruding a food material through the front wall openings and through the die conduits into a convergent discharge conduit removably attached to the housing. Separable supply conduits connect a pressure source of supply of a different food material with the housing at opposite sides thereof as well as between such opposite sides. The supply conduits include an elongate manifold conduit extending transversely of the housing, a pair of substantially semi-circular conduit fittings for connecting opposite ends of the manifold conduit with the opposite sides of the housing, respectively, and at least one conduit for connecting the manifold conduit intermediate its ends with the housing between the opposite sides thereof. The die conduits preferably extend in cantilever fashion from individual headers which are clamped together in the assembled apparatus, so one or more of the die conduits can be easily replaced with other die conduits of different shape or shapes. One or more plug means for changing material flow capacity of selected conduit sections is preferably provided.

THE DRAWINGS

Embodiments of apparatus representing the best modes presently contemplated for carrying out the invention in actual practice are illustrated in the accompanying drawings, in which:

FIG. 1 is a view in top plan of apparatus for forming bacon slabs, the apparatus being arranged to discharge into a belt conveyor which is shown fragmentarily;

FIG. 2, a transverse vertical section taken on the line 2—2 of FIG. 1 and drawn to a considerably larger scale;

FIG. 3, a fragmentary longitudinal section taken on the line 3—3 of FIG. 2 and drawn to the same scale;

FIG. 4, an exploded perspective view showing the various parts of the apparatus and indicating their positional interrelationship;

FIG. 5, a view in elevation taken from the standpoint of the line 5—5 of FIG. 4 and showing the front face of the compound die, the view being drawn to a considerably larger scale;

FIG. 6, a view corresponding to the die portion of FIG. 2 but showing a different die formation, the view being drawn to the larger scale of FIG. 5;

FIG. 7, a view corresponding to that of FIG. 5 but showing a still different die formation and being drawn to a somewhat smaller scale;

FIG. 8, a transverse vertical section through the die of FIG. 7 looking in the same direction as for the view of FIG. 7; and FIG. 9, a transverse vertical section through the meat product produced by the die of FIGS. 7 and 8, looking in the same direction as for the views of FIGS. 7 and 8;

FIG. 10, a view corresponding to that of FIG. 4 but showing a now preferred embodiment of the apparatus;

FIG. 11, a vertical section on the line 11—11 of FIG. 10; and

FIG. 12, a vertical section on the line 12—12 of FIG. 11.

DETAILED DESCRIPTION OF ILLUSTRATED EMBODIMENTS

Figure 1:
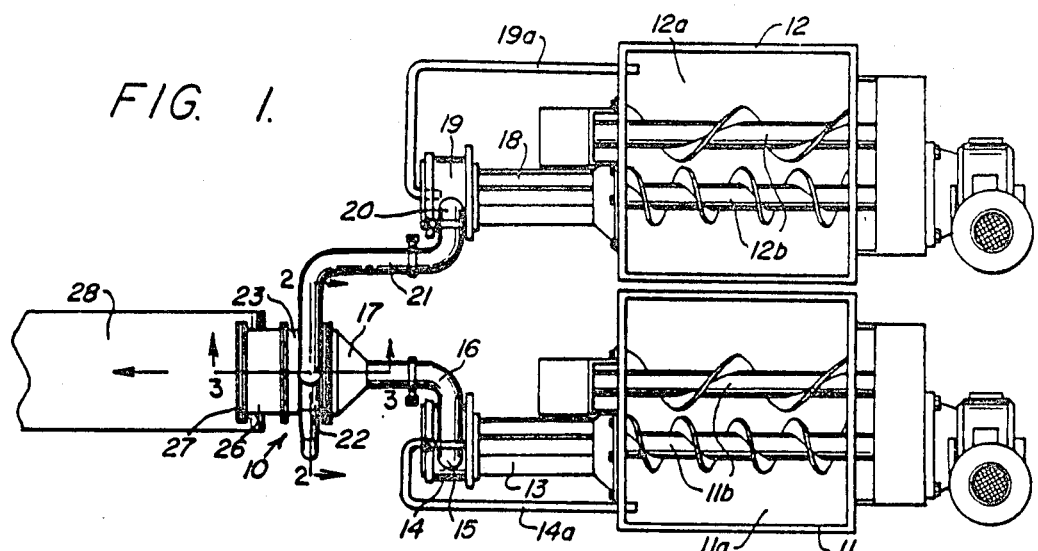

In the form illustrated in FIGS. 1–9, the apparatus of the invention comprises a compound die 10 of broadly rectangular configuration through which respective components of the final product are differentially extruded. Since naturally formed and processed bacon slabs are made up of random striations of fat and lean pork as they occur in pork bellies, the materials fed to die 10 in the present instance are minced lean pork trimmings and fat pork trimmings, respectively, and the apparatus includes means for continuously feeding these materials to respectively different, non-communicating portions 10a and 10b of the die.

The feeding means comprise in this embodiment of the invention twin screw, mixer feeders 11 and 12, respectively, which may be of any suitable type, but are preferably as disclosed and claimed in McFarland U.S. Pat. No. 3,825,231, granted July 23, 1974, and entitled "Twin Screw Continuous Processing Machines". Each comprises a hopper, 11a and 12a, respectively, and twin screw conveyors, 11b and 12b, respectively. The discharge from mixer feeder 11 leads through conduit 13, food pump 14, riser 15, and conduit 16 to the front of die 10 and into individual conduit portions 10a thereof by way of plenum fitting 17, while discharge from mixer feeder 12 leads through conduit 18, food pump 19, riser 20, conduit 21, and header or manifold 22 into rectangular die housing 23 surrounding the die conduits 10a and forming therewith the intercommunicating die passages 10b. Part of such discharge passes through the top wall of die housing 23 by way of nipple members 23a and b thereof and into interior passage portions 10b thereof that surround but are not in communication with the passage portions 10a of the die. Other parts of such discharge pass out of respectively opposite ends 22a and b of header 22, through substantially semi-circular conduit fittings 24 and 25, respectively, and through respective side walls of die housing 23 by way of nipple members 23c and d thereof, respectively, and into the same interior passage portions 10b thereof into which nipple members 23a and b discharge, but at opposite ends of such passage portions 10b so as to insure complete filling thereof with the material to be extruded therethrough and therefrom.

Figure 3:
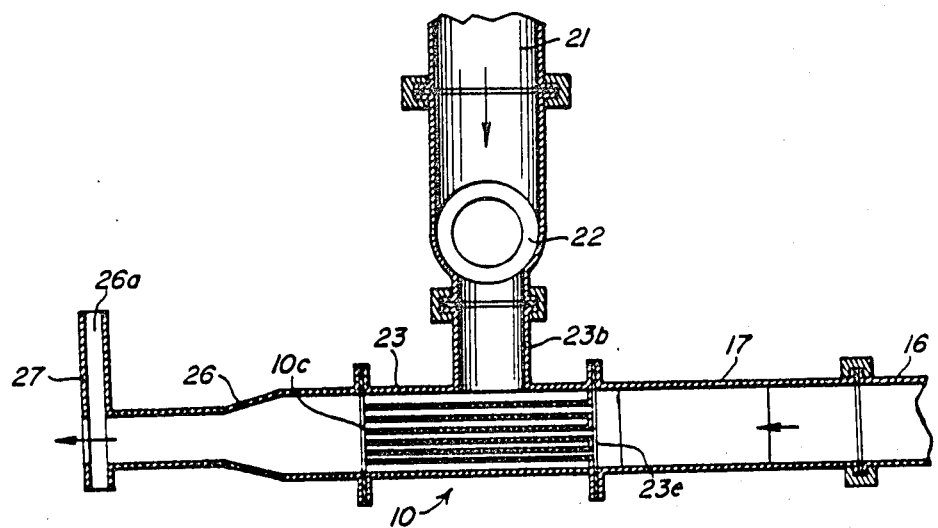

Portions 10a of die 10 are rigidly secured in front wall 23e of die housing 23 and extend backwardly in cantilever fashion through the interior of such die housing to terminate in a common area at the open rear of the housing which forms discharge orifice 10c, FIGS. 3 and 4, on the die. Non-communicating die passages 10a and 10b of the die have discharges in common at die discharge orifice 10c, so that the discharged extrusion product is a continuous column of the different materials from hoppers 11a and 12a interleaved as random striations.

Means are provided at the common discharge area of die 10 for applying consolidating pressure to the extruded column that emerges from die 10 through discharge orifice 10c. In this illustrated instance, a convergent conduit 26 having substantially the cross-sectional shape of the extruded column is provided as a continuation of die 10, so the extruded column is compressed as the extrusion process continues within and through conduit 26. The final extrusion emerges through a discharge plate 27, which is provided in this instance as a cover for the recessed discharge end 26a, see FIGS. 3 and 4, of conduit 26 to accommodate a cut-off knife (not shown) if desired for making either slab or strip cuts as desired. Discharge of bacon strips, slabs, or of a continuous column for later cutting, is preferably directly onto a belt conveyor 28, FIG. 1.

It is desirable, and a feature of the invention advantageously included in all instances, that the operation be carried out under conditions of deaereation of the feed material, whereby voids are prevented in the final product. To this end, pumps 14 and 19 are constructed to substantially eliminate air from the feed material that is passed from hoppers 11a and 12a to extrusion die 10. Such pumps are preferably of rotary, vane type, e.g., similar to that shown by U.S. Pat. No. 2,968,253 of Jan. 17, 1971. For deaeration purposes, pipes or hoses 14a and 19a are passed through the face plates of the respective pumps to pressure areas adjacent the respective axes of such pumps and extend to discharge above or within the respective feed hoppers 11a and 12a so that any solid material discharged with the air or other gas will be recycled.

The several parts of the apparatus above-described are preferably made as separate pieces, as shown in FIG. 4, and removably secured together by bolts, screws, clamps, or the like with interposed gaskets, as indicated, to prevent leakage and to permit easy cleaning after use.

Figure 6:
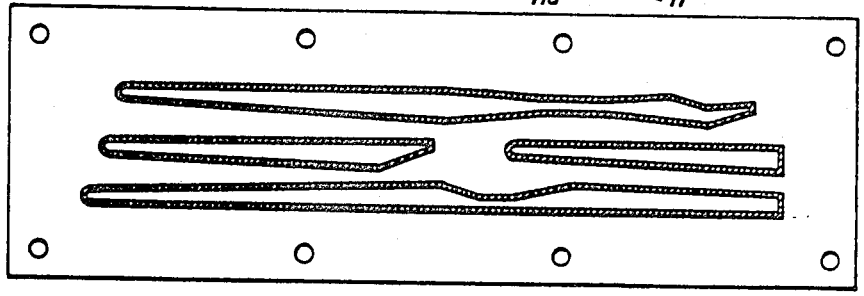
Figure 5:
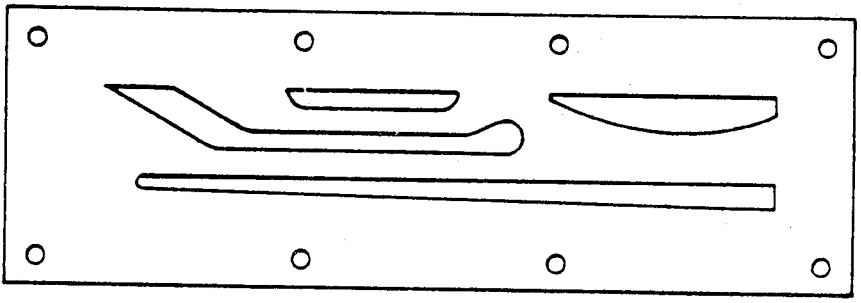

In FIG. 6 is shown a variation of the bacon striation pattern for the die.

Figure 7:
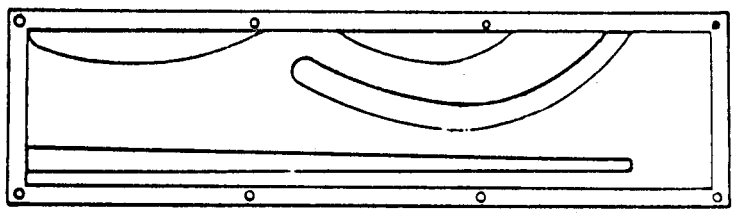
Figure 8:
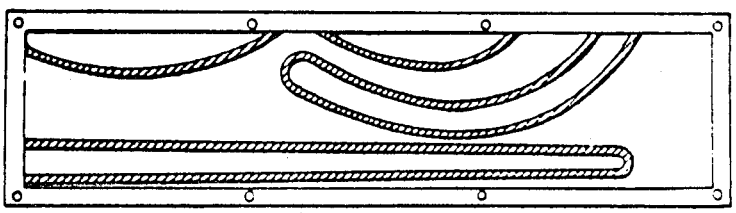
Figure 9:
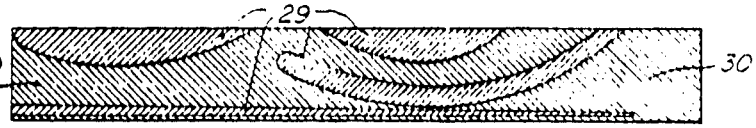
Figure 2:
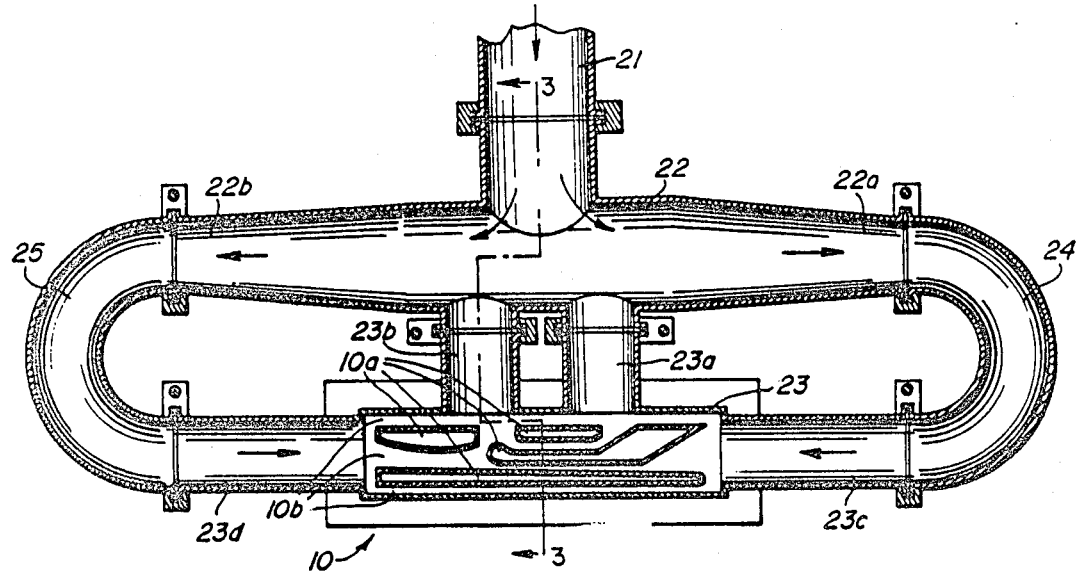

In FIGS. 7 and 8 is shown still another variation of the bacon striation, the consolidated extrusion product therefrom being shown in FIG. 9 with the interleaved materials designated 29 and 30, respectively.

For consolidation purposes, suitable binders such as mineral salts which chemically affect superficial surfaces of meat to provide protein adhesive coatings thereon, may be introduced with the meat materials, and the resulting composite extrusions may be exposed to microwaves for protein coagulation prior to case hardening and tempering in the usual manner to facilitate slicing.

Die configuration can, of course, be varied and die construction will be as required for particular types of products, the illustrated embodiment being suitable for the type of interleaving that produces striations resembling bacon. For other products, it may be desirable to have more than two different materials and it may be desirable to have regular striations or laminations, rather than the random ones found desirable to simulate bacon.

In producing simulated bacon by the extrusion process previously described, it is not necessary to use pork as the feed meat materials. Other meats and/or vegetable materials, such as beef, lamb, goat, sea foods, poultry, meat substitutes of vegetable origin, cereals, etc. may be extruded through the same die arrangement. Also, as previously indicated, the extrusion die arrangement may be such as to produce a variety of simulated shapes and cuts other than bacon.

A somewhat later embodiment of the apparatus of the invention as specifically employed for the production of simulated bacon slabs is now preferred and is illustrated in FIG. 10 in exploded form corresponding to the showing of the original embodiment in FIG. 4.

In this form of the invention, individual die conduits, as at 31 and 32, or individual conduit die sets, as at 33a and 33b, extend in cantilever fashion from respective headers, 34, 35, and 36, which are adapted to be clamped together as a single unit by means of a clamping device, 37.

For stability during use and for ease of assembly, die conduit headers 34 and 35 are grooved as at 34a and 35a, respectively, and die conduit header 36 is grooved as at 36a and 36b for mating with the grooves 34a and 35a. Also, clamping device 37 is provided with upper and lower channels 37a and 37b, respectively, for the insetting thereinto of the assembled die conduit headers 34, 35, and 36 prior to clamping them into place by means of clamping screws 37c and 37d and clamping nuts 37b and 37f.

As so assembled and clamped together as a unit, the die conduit headers are properly aligned with respective extrusion entry openings 38, 39, 40a, and 40b of front wall 41 of die housing 42 by sets of pins 43 projecting from the respective headers for reception by correspondingly placed holes 44 in die housing front wall 41 and by correspondingly placed holes 45 in securement flange 46a of plenum fitting 46.

It should be noted that front wall 41 of die housing 42 is provided with continuous peripheral grooves, as at 47, surrounding extrusion entry openings 38, 39, 40a, and 40b for the reception of O-ring type of gaskets 48 and 49, respectively, and that pins 43 project backwardly from front wall 34, as at 43a, for reception by correspondingly placed openings 50 in a securement flange 42a of die housing 42 and by correspondingly placed holes 51 in a gasket 52 which is interposed between the clamped die conduit headers and such flange 42a of the die conduit housing.

It has been found unnecessary to make the die conduits as long as indicated for the previously described embodiment of FIG. 4. Consequently, die housing 42 is shorter from front to back than is die housing 23 of the first embodiment. As in the first embodiment, the die conduits of the present embodiment extend entirely through die housing 42 and terminate at a rear securement flange 42b of die housing 42. A convergent discharge conduit (not shown) corresponding to the discharge conduit 26 of the first embodiment, is removably attached to die conduit housing 42, preferably by a second clamping device 53 engaging securement flange 42b of die housing 42 and a similar securement flange (not shown) on the discharge conduit along with an interposed gasket 54.

A feed material simulating the lean meat component of a bacon slab is fed under pressure and deaeration into plenum fitting 46 for extrusion through entry openings 38, 39, and 40a and 40b of front plate 41 into and through die conduits 31, 32, and 33a and 33b, respectively, in the manner and by the means previously described with respect to the first embodiment.

As in the first embodiment, a food material simulating the fat component of a bacon slab is similarly fed under pressure and deaeration to the die passages surrounding the die conduits in the housing 42 when the apparatus is assembled for use. Thus, such fat-simulating food material is fed into elongate header or manifold 55 which extends transversely of the die conduits and the die housing in the assembled form of the apparatus similar to the showing in FIGS. 2 and 3. Semi-circular conduit fittings 56 and 57 are adapted to removably connect opposite ends 55a and 55b of manifold 55 with nipple members 42c and 42d, respectively at opposite lateral sides of die housing 42, thereby projecting the feed material through the die passages that are interleaved with the die conduits.

Part of the feed material will, as in the first embodiment, be projected into the interior of the die housing through a wall thereof that extends between the opposite lateral sides of such die housing. Here, only one nipple member 42e is provided in the upper wall of die housing 42 for connection with a single nipple member 55c depending from manifold 55. The feed material is introduced into nipple member 55d of manifold 55 as described for the first embodiment with respect to feed conduit 21 thereof.

It has been found advantageous to control the quantity of feed through one or more of the nipple members 55d, 55a, and 55b by means of respective insertable and removable plugs 58, FIGS. 11 and 12, which have a substantially semi-circular base 58a and which are tapered along their lengths therefrom to an apex 58b. Each plug is supported by a plate member 59 provided, as by welding, at the base and partially across the opening of a nipple member in its joinder to the die housing 42. To keep the plug from turning or rotating in its nipple member when installed, a boss 58c is provided at and projecting longitudinally from the forward portion of base 58a for engagement with the forward margin of the corresponding plate member 59.

The base of a plug 58 may be more or less than semi-circular as circumstances may warrant in any particular use of the apparatus, and, in each instance, the supporting plate 59 will be similarly dimensioned to receive the protruding boss 58c of the plug.

It should be realized that one or more of the plugs, or none, may be employed in any given instance of use of the apparatus as may be deemed necessary or desirable by the operator.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. In apparatus for extruding composite food products from different food materials, which apparatus includes a plurality of hoppers for the supply of the respective food materials, a corresponding plurality of food pumps having deaerating means associated therewith, and conduits leading from said hoppers to said food pumps; an extrusion assembly comprising an extrusion die including a housing having a separable front wall and an open rear, and a plurality of individual die conduits adapted to extend within the housing along their lengths from securement to and opening through said front wall, and for providing a plurality of die passages within the housing, interleaved with said die conduits, and open to the interior of the housing; a plenum feed fitting adapted to be separably attached to the die housing at said front wall thereof and having an outlet for comprehending the openings of said plurality of die conduits through said front wall; supply conduits for separably interconnecting said food pumps with said plenum feed fitting and with the interior of said housing at diverse locations, respectively; said supply conduits including an elongate header conduit for extending transversely of said housing and of said die conduits, a pair of removable substantially semi-circular conduit fittings and an associated pair of nipple members for interconnecting respective ends of said header conduit with mutually opposite lateral sides of said housing so as to supply a food material from one of the hoppers to said die passages within the housing, a pair of nipple members leading into the housing between said lateral sides thereof, and means for removably connecting said header conduit intermediate its length with the last named nipple members to further supply a food material from said one hopper to said die passages within said housing; a convergent discharge conduit adapted to be separably attached to the die housing and having its larger end substantially commensurate with and adapted to be in registry with the open rear of said housing for receiving extruded material therefrom, compressing it into a unitary slab, and for discharging the slab; and securement means for detachably securing supply conduits, plenum feed fitting, separable die components, and discharge conduit together.

2. The invention set forth in claim 1, wherein the hoppers are adapted to receive respective component materials for a bacon-simulating product; and wherein the die housing is broadly rectangular, and the die conduits and die passages are interleaved to simulate the fat and lean striations of a slab of bacon.

3. The invention set forth in either claim 1 or 2, wherein means are associated with the respective passageways of one or more of the nipple members for controlling the quantity of feed therethrough.

4. The invention set forth in claim 1, wherein one or more plugs are removably positioned across portions of the passageways of respective nipple members for controlling the quantity of feed therethrough.

5. The invention set forth in claim 4, wherein plug-supporting means are fixed to the respective nipple means within the passageways thereof.

6. In apparatus for extruding composite food products from different food materials, which apparatus includes a plurality of hoppers for the supply of the respective food materials, a corresponding plurality of food pumps having deaerating means associated therewith, and conduits leading from said hoppers to said food pumps; and extrusion assembly comprising an extrusion die including a housing having a separable front wall and an open rear, and a plurality of individual die conduits extending in cantilever fashion from individual headers that are adapted to be clamped together, said front wall having openings corresponding to and adapted to be aligned with the respective die conduits, said die conduits being adapted to extend within said housing for providing a plurality of die passages within the housing, interleaved with said die conduits, and open to the interior of the housing; means for aligning said headers with said front wall openings; means for clamping said individual headers together; a plenum feed fitting adapted to be separably attached to the die housing at said front wall thereof and having an outlet for comprehending the openings of said plurality of die conduits through said front wall; supply conduits for separably interconnecting said food pumps with said plenum feed fitting and with the interior of said housing at diverse locations, respectively; said supply conduits including an elongate manifold conduit for extending transversely of said housing and of said die conduits, a pair of removable substantially semi-circular conduit fittings and an associated pair of nipple members for interconnecting respective ends of said header conduit with mutually opposite lateral sides of said housing so as to supply a food material from one of the hoppers to said die passages witin the housing, at least one nipple member leading into the housing through a wall thereof that extends between said lateral sides thereof, and means for removably connecting said header conduit intermediate its length with the last named nipple member to further supply a food material from said one hopper to said die passages within said housing; a convergent discharge conduit adapted to be separably attached to the die housing and having its larger end substantially commensurate with and adapted to be in registry with the open rear of said housing for receiving extruded material therefrom, compressing it into a unitary slab, and for discharging the slab; and securement means for detachably securing supply conduits, plenum feed fitting, separable die components, and discharge conduit together.

7. The invention set forth in claim 6, wherein the hoppers are adapted to receive respective component materials for a bacon-simulating product; and wherein the die housing is broadly rectangular, and the die conduits and die passages are interleaved to simulate the fat and lean striations of a slab of bacon.

8. The invention set forth in claim 6, wherein one or more plugs are removably positioned across portions of the passageways of respective nipple members for controlling the quantity of feed therethrough.

9. The invention set forth in claim 8, wherein plug-supporting means are fixed to the respective nipple means within the passageways thereof.

* * * * *